(12) United States Patent
Chenault

(10) Patent No.: US 8,097,696 B2
(45) Date of Patent: Jan. 17, 2012

(54) METHOD FOR PREPARING MULTI-ARM POLY(ETHYLENE GLYCOL) CHLORIDES

(75) Inventor: Henry Keith Chenault, Hockessin, DE (US)

(73) Assignee: Actamax Surgical Materials, LLC, Berkeley, CA (US)

( * ) Notice: Subject to any disclaimer, the term of this patent is extended or adjusted under 35 U.S.C. 154(b) by 0 days.

(21) Appl. No.: 12/957,477

(22) Filed: Dec. 1, 2010

(65) Prior Publication Data

US 2011/0077432 A1 Mar. 31, 2011

Related U.S. Application Data

(62) Division of application No. 11/732,952, filed on Apr. 5, 2007, now Pat. No. 7,868,132.

(60) Provisional application No. 60/794,806, filed on Apr. 25, 2006.

(51) Int. Cl.
| | |
|---|---|
| *C08G 61/00* | (2006.01) |
| *C08G 61/04* | (2006.01) |
| *C07C 209/00* | (2006.01) |
| *C08G 73/02* | (2006.01) |
| *C08G 65/34* | (2006.01) |

(52) U.S. Cl. ........ 528/397; 528/423; 528/425; 528/482; 528/485; 528/486; 528/489; 528/492; 528/502 R; 528/503; 564/474

(58) Field of Classification Search ............... 528/397, 528/423, 425, 482, 485, 486, 489, 492, 502 R, 528/503; 564/474
See application file for complete search history.

(56) References Cited

U.S. PATENT DOCUMENTS

| | | | |
|---|---|---|---|
| 3,654,370 | A | 4/1972 | Yeakey |
| 4,618,717 | A | 10/1986 | Renken et al. |
| 4,766,245 | A | 8/1988 | Larkin et al. |
| 5,510,535 | A | 4/1996 | Adkins et al. |
| 6,858,736 | B2 | 2/2005 | Nho et al. |
| 2003/0149307 | A1 | 8/2003 | Hai et al. |
| 2004/0225097 | A1 | 11/2004 | Nho et al. |
| 2006/0078536 | A1 | 4/2006 | Kodokian et al. |

OTHER PUBLICATIONS

Harris J M: "Laboratory Synthesis of Polyethylene Glycol Derivatives" Journal of Macromolecular Science-Reviews in Macromolecular Chemistry, Marcel Dekker Journals. New York, US, vol. C-25, No. 3, 1985, pp. 325-373, XP002036446.

*Primary Examiner* — Duc Truong
(74) *Attorney, Agent, or Firm* — McCarter & English

(57) ABSTRACT

A method for preparing multi-arm poly(ethylene glycol) (PEG) chlorides from multi-arm PEG polyols is described. The method comprises a process, wherein the multi-arm PEG polyol is reacted with thionyl chloride to form the multi-arm PEG chloride.

11 Claims, No Drawings

METHOD FOR PREPARING MULTI-ARM POLY(ETHYLENE GLYCOL) CHLORIDES

CROSS-REFERENCE TO RELATED APPLICATION

This application is a divisional of U.S. patent application Ser. No. 11/732,952, filed Apr. 5, 2007 now U.S. Pat. No. 7,868,132, which claims the benefit of U.S. Provisional Application Ser. No. 60/794,806, filed Apr. 25, 2006, now expired, the disclosures of which are herein incorporated by reference in their entirety.

FIELD OF THE INVENTION

Disclosed herein are methods of preparing multi-arm poly (ethylene glycol) (PEG) chlorides and amines. Specifically, multi-arm PEG amines are prepared from multi-arm PEG polyols via a two step process, wherein the multi-arm PEG polyol is reacted with thionyl chloride and the resulting multi-arm PEG chloride is subsequently reacted with aqueous or anhydrous ammonia.

BACKGROUND OF THE INVENTION

Multi-arm poly(ethylene glycol) (PEG) amines have utility in the preparation of hydrogels for drug delivery, for conjugation to proteins to reduce toxicity and prolong the lifetime of the protein in the body, and for surface functionalization of medical devices and appliances. Of particular interest is the use of multi-arm PEG amines for the preparation of tissue adhesives formed by reacting the multi-arm PEG amine with an oxidized polysaccharide, as described by Kodokian et al. (copending and commonly owned U.S. Patent Application Publication No. 2006/0078536).

Methods for preparing multi-arm polyoxyalkylene amines are known. For example, Larkin et al. (U.S. Pat. No. 4,766, 245) describe the conversion of three-arm and 8-arm poly (propylene glycols) to the corresponding polyamines by reaction with ammonia in the presence of hydrogen and a Raney nickel/aluminum catalyst. Nho et al. (U.S. Patent Application Publication No. U.S. 2004/0225097) describe the conversion of multi-arm PEG polyols to their corresponding multi-arm PEG amines by tosylation followed by reaction with aqueous ammonia for ten days. Additionally, Buckmann et al. (*Makromol. Chem.* 182:1379-1384 (1981)) describe the conversion of linear PEG to the corresponding diamine via a two step reaction comprising reacting the PEG with thionyl bromide to form the bromide derivative, followed by reaction with ethanolic ammonia.

All of the aforementioned methods suffer from various limitations, particularly when the multi-arm PEG amine is to be used in the preparation of hydrogels for use as a tissue adhesive or for drug delivery applications. Specifically, the conversion of the hydroxyl end groups to primary amines using these methods is generally less than 95%, which results in a low crosslink density when the multi-arm PEG amine is used to form a hydrogel tissue adhesive or drug delivery composition. Methods based on the use of the strong acid thionyl bromide result in acid-catalyzed depolymerization of the PEG polymer. Additionally, some methods result in the formation of salts or the contamination of the product with heavy metals or other toxic substances, all of which must be separated from the multi-arm PEG amine product.

Therefore, the problem to be solved is to provide a method for the preparation of multi-arm PEG amines from multi-arm PEG polyols that results in a high conversion of the hydroxyl end groups to primary amines. The method should also minimize acid-catalyzed depolymerization of the PEG, avoid the formation of salts, minimize the use of organic solvents, and avoid potential contamination with toxic byproducts.

Applicants have addressed the stated problem by discovering a two step method for preparing multi-arm PEG amines from multi-arm PEG polyols, wherein the multi-arm PEG polyol is reacted with thionyl chloride, and the resulting multi-arm PEG chloride is subsequently reacted with aqueous or anhydrous ammonia.

SUMMARY OF THE INVENTION

The invention provides a method for preparing multi-arm PEG chlorides. The multi-arm PEG chloride is prepared by reacting at least one multi-arm PEG polyol with thionyl chloride under conditions which minimize acid-catalyzed depolymerization of the multi-arm PEG. The conversion of hydroxyl end groups to chloride end groups is greater than about 95%.

Accordingly, in one embodiment the invention provides a method for making a composition comprising at least one multi-arm PEG chloride having from 3 to about 10 arms comprising the steps of:
  a) reacting at a temperature of less than or equal to about 100° C., optionally in the presence of a solvent, thionyl chloride and at least one multi-arm PEG polyol having from 3 to about 10 arms, to form a multi-arm PEG chloride having at least about 95% of hydroxyl end groups of the multi-arm PEG polyol converted to chloride end groups; and
  b) separating the multi-arm PEG chloride from unreacted thionyl chloride and the optional solvent.

DETAILED DESCRIPTION OF THE INVENTION

The various embodiments of the invention provide methods for preparing multi-arm PEG chlorides and amines from multi-arm PEG polyols. The multi-arm PEG polyol is reacted with thionyl chloride, using little or no organic solvent under low temperature conditions, to form the multi-arm PEG chloride. Then, the multi-arm PEG chloride is reacted with aqueous or anhydrous ammonia to form the corresponding multi-arm PEG amine.

The multi-arm PEG amine may be used for various applications, including but not limited to, preparing hydrogels for use as tissue adhesives or for drug delivery, for conjugation to proteins to reduce toxicity and prolong the lifetime of the protein in the body, and for surface functionalization of medical devices and appliances.

The following definitions are used herein and should be referred to for interpretation of the claims and the specification.

The term "multi-arm PEG polyol", also referred to herein as "multi-arm PEG-OH", refers to a branched poly(ethylene glycol), wherein from 3 to about 10 of the branches ("arms") are terminated by a hydroxyl group.

The term "multi-arm PEG chloride", also referred to herein as "multi-arm PEG-Cl", refers to a branched poly(ethylene glycol), wherein from 3 to about 10 of the branches ("arms") are terminated by a chloride group.

The term "multi-arm PEG amine", also referred to herein as "multi-arm PEG-NH$_2$", refers to a branched poly(ethylene glycol), wherein from 3 to about 10 of the branches ("arms") are terminated by a primary amine group.

The term "dendritic poly(ethylene glycol)", also referred to herein as "dendritic PEG", refers to a highly branched multi-arm poly(ethylene glycol) having a tree-like structure.

The term "comb poly(ethylene glycol)", also referred to herein as "comb PEG", refers to a multi-arm poly(ethylene glycol) having a main chain with multiple trifunctional branch points from each of which a linear arm emanates.

The term "star poly(ethylene glycol)", also referred to herein as "star PEG", refers to a multi-arm poly(ethylene glycol) having a central branch point, which may be a single atom or a chemical group, from which linear arms emanate.

The term "oxidized polysaccharide" refers to a polysaccharide which has been reacted with an oxidizing agent to introduce aldehyde groups into the molecule.

The term "% by weight" as used herein refers to the weight percent relative to the total weight of the solution, unless otherwise specified.

The term "hydrogel" refers to a water-swellable polymeric matrix, consisting of a three-dimensional network of macromolecules held together by covalent or non-covalent crosslinks, that can absorb a substantial amount of water to form an elastic gel.

Disclosed herein are methods for preparing multi-arm PEG chlorides and amines from multi-arm PEG polyols. The multi-arm PEG polyol is reacted with thionyl chloride using little or no organic solvent under low temperature conditions, which minimize acid-catalyzed depolymerization of the PEG, to form the multi-arm PEG chloride. Then, the multi-arm PEG chloride is reacted with aqueous or anhydrous ammonia to form the corresponding multi-arm PEG amine. The method results in high conversions of the hydroxyl end groups to chloride end groups and the chloride end groups to primary amines, is highly selective for forming the primary amines in the free base form, minimizes acid-catalyzed depolymerization of the PEG, avoids the formation of salts, minimizes the amount of organic solvents used, and avoids contamination of the product with toxic substances.

Multi-Arm PEG Polyols

The starting material for the methods disclosed herein is a multi-arm PEG polyol having from 3 to about 10 of the arms terminated by a hydroxyl group. Suitable multi-arm PEG polyols include, but are not limited to, dendritic, comb, and star poly(ethylene glycols). Typically, useful multi-arm PEG polyols have a molecular weight of about 450 to about 200,000 Daltons, in addition from about 2,000 to about 40,000 Daltons. It should be recognized that the multi-arm PEG polyols are generally a heterogeneous mixture having a distribution of arm lengths and in some cases, a distribution of species with different numbers of arms. When a PEG polyol has a distribution of species having different numbers of arms, it can be referred to based on the average number of arms in the distribution. For example, in one embodiment the multi-arm PEG polyol is an 8-arm star PEG polyol, available from Nektar Transforming Therapeutics (Huntsville, Ala.), which comprises a mixture of multi-arm star PEG polyols, some having less than and some having more than 8 arms; however, the multi-arm star PEG polyols in the mixture have an average of 8 arms. Additionally, a mixture of multi-arm PEG polyols having a different number of arms and/or a different molecular weight may be used as the starting material.

In another embodiment, the multi-arm PEG polyol is a 6-arm star PEG polyol, available from SunBio Corp. (Orinda, Calif.).

In another embodiment, the multi-arm PEG polyol is a 4-arm star PEG polyol, available from NOF America Corp. (White Plains, N.Y.).

Other multi-arm PEG polyols are also available commercially from companies such as Nektar Transforming Therapeutics, SunBio Corp., and NOF America Corp. Alternatively, multi-arm PEG polyols may be synthesized using methods known in the art (see for example, Merrill et. al., U.S. Pat. No. 5,830,986; Hamann et al., EP 540823; and Nho et al., U.S. Patent Application Publication No. 2004/096507).

Preparation of Multi-Arm PEG Chloride

A composition comprising at least one multi-arm PEG chloride is prepared by converting at least one multi-arm PEG polyol to at least one multi-arm PEG chloride. Because the starting multi-arm PEG polyol is generally a heterogeneous mixture having a distribution of species with different numbers of arms, as noted above, the composition comprising the multi-arm PEG chloride will also be a heterogeneous mixture.

The multi-arm PEG polyol may be dried before use in the reaction using methods known in the art, such as heating under vacuum or azeotropic distillation using a solvent, such as toluene, under reduced pressure. To effect the conversion, the multi-arm PEG polyol is reacted with thionyl chloride (CAS No. 7719-09-7) at a temperature less than or equal to about 100° C., preferably about 0° C. to about 100° C., and more preferably about 20° C. to about 100° C., for a period of time sufficient to convert the hydroxyl end groups to chloride end groups, typically about 2 hours to about 24 hours. The lower limit of the temperature range that may be used depends on the nature of the multi-arm PEG polyol. Specifically, the temperature should be sufficient to provide a homogeneous reaction mixture. For example, for a low molecular weight multi-arm PEG polyol that is a liquid at room temperature, the reaction may be done at ambient temperature (i.e., about 23° C.), while for a high molecular weight multi-arm PEG polyol, a higher temperature will be required to dissolve the polyol and give a homogeneous reaction mixture.

Optionally, the reaction of the multi-arm PEG polyol with thionyl chloride may be carried out in the presence of a catalyst to increase the rate of reaction. Suitable catalysts include, but are not limited to, N,N-dialkylformamides such as N,N-dimethylformamide, N,N-diethylformamide, N-formylmorpholine, N-formylpiperidine and N-formylpyrrolidine; iron(III) salts such as ferric chloride, ferric oxide, and ferric sulfate; and mixtures thereof.

The use of these low temperature conditions and the use of thionyl chloride, instead of thionyl bromide, minimizes the acid-catalyzed depolymerization of the multi-arm PEG. The reaction may be carried out under a dry atmosphere, such as dry nitrogen. The use of a solvent in the reaction is optional. Preferably, the reaction is carried out in the absence of a solvent; however, a solvent may be required in the case of high molecular weight multi-arm PEG polyols to give a homogeneous solution. Suitable solvents include, but are not limited to, toluene, benzene, xylene, chlorobenzene, dichloromethane, chloroform, carbon tetrachloride, 1,2-dichloroethylene, trichloroethylene, perchloroethylene, 1,2-dichloroethane, 1,1,1-trichloroethane, diethyl ether, diisopropyl ether, tetrahydrofuran, dioxane, acetone, methyl ethyl ketone, methyl isobutyl ketone, N,N-dimethylformamide, N,N-dimethylacetamide, and mixtures thereof.

The multi-arm PEG chloride product may be isolated from the thionyl chloride and the optional solvent using methods that are well known in the art. Because no base is used, the multi-arm PEG chloride may be isolated without the need for separation from salts, simply by evaporating excess thionyl chloride and the optional solvent (if used) under reduced pressure. A solvent such as toluene may be added to aid in the removal of the thionyl chloride.

In the reaction, the conversion of hydroxyl end groups to chloride end groups is at least about 95%. The extent of conversion of hydroxyl end groups to chloride end groups may be determined using methods known in the art, such as nuclear magnetic resonance spectroscopy (NMR) or by titrating the remaining hydroxyl groups by an established method, for example ASTM D4252 (*Standard Test Methods for Chemical Analysis of Alcohol Ethoxylates and Alkylphenol Ethoxylates*).

Preparation of Multi-Arm PEG Amine

A composition comprising at least one multi-arm PEG amine is prepared by converting the chloride end groups of at least one multi-arm PEG chloride, prepared as described above, to primary amine end groups. Because the starting multi-arm PEG polyol used to prepare the multi-arm PEG chloride is generally a heterogeneous mixture having a distribution of species with different numbers of arms, as noted above, the composition comprising the multi-arm PEG amine will also be a heterogeneous mixture.

The conversion of chloride end groups of the multi-arm PEG chloride to primary amine end groups is effected by forming a reaction mixture by reacting the multi-arm PEG chloride with aqueous ammonia or anhydrous ammonia for a time and at a temperature sufficient to form a reaction product in which at least about 95% of the chloride end groups are converted to amine end groups. The extent of conversion of chloride end groups to amine end groups may be determined using methods known in the art, such as nuclear magnetic resonance spectroscopy (NMR) or titration (see for example, Fields, *Biochem. J.* 124:581-590 (1971)). Preferably, the aqueous ammonia is concentrated aqueous ammonia having a concentration of about 28% by weight, although lower ammonia concentrations may also be used. The reaction of the multi-arm PEG chloride with aqueous ammonia or anhydrous ammonia is preferably carried out in a sealed reaction vessel, such as a pressure vessel, to prevent evaporation of the ammonia. Pressure develops in the sealed vessel, the amount of which depends on the conditions (e.g., amount of ammonia and the temperature) used in the reaction.

In one embodiment, the multi-arm PEG chloride is reacted with concentrated aqueous ammonia (i.e., about 28% by weight) at a temperature between about 60° C. and about 100° C. for a time of about 4 hours to about 48 hours. As is known in the art, lower temperatures require a longer reaction time. For example, the reaction time is about 48 hours at a temperature of 60° C., while the reaction is complete after about 4 hours at a temperature of 100° C. The amount of concentrated aqueous ammonia used should be sufficient to prevent gelation of the reaction mixture. The optimum amount of concentrated aqueous ammonia to use in the reaction may be determined by one skilled in the art using routine experimentation. After completion of the reaction, the ammonia may be removed using methods known in the art, such as sparging with dry nitrogen, rotary evaporation, concentration under reduced pressure, or combinations thereof.

In another embodiment, the multi-arm PEG chloride is reacted with anhydrous ammonia at a temperature between about 60° C. and about 100° C. for a time of about 4 hours to about 48 hours. The amount of anhydrous ammonia used should be sufficient to prevent gelation of the reaction mixture. The optimum amount of anhydrous ammonia to use in the reaction may be determined by one skilled in the art using routine experimentation. After completion of the reaction, the ammonia may be removed using methods known in the art, such as such as sparging with dry nitrogen, rotary evaporation, concentration under reduced pressure, or evaporation at ambient temperature and pressure.

The reaction of the multi-arm PEG chloride with aqueous or anhydrous ammonia also generates HCl, which optionally may be removed using various methods. For example, the HCl may be removed using ion exchange with a strongly basic anion exchange resin in the hydroxide form, such as Purolite® A-860 (The Purolite Co., Bala-Cynwyd, Pa.), in either a batch or column process. Alternatively, the HCl may be converted to a salt by the addition of a base, such as potassium carbonate, sodium carbonate, lithium carbonate, potassium hydroxide, sodium hydroxide, lithium hydroxide, potassium bicarbonate, sodium bicarbonate, or lithium bicarbonate. Then, the multi-arm PEG amine may be isolated from the salt using methods that are well known in the art, such as solvent extraction, precipitation, dialysis, or ultrafiltration.

Optionally, water may be removed from the reaction product, either after the completion of the reaction or after the optional removal of HCl, using any suitable known method, for example, lyophilization, ultrafiltration, or spray drying.

The multi-arm PEG amine may then be used for its intended purpose. For example, the multi-arm PEG amine may be used in the form of an aqueous solution and reacted with an aqueous solution comprising an oxidized polysaccharide, such as dextran aldehyde, to produce a hydrogel that is useful as a tissue adhesive or for drug delivery, as described by Kodokian et al. (copending and commonly owned U.S. Patent Application Publication No. U.S. 2006/0078536, incorporated herein by reference). Specifically, the multi-arm PEG amine is added to water to give a concentration of about 5% to about 70% by weight relative to the total weight of the solution. The oxidized polysaccharide is prepared using methods known in the art (for example, Mo et al., *J. Biomater. Sci. Polymer Edn.* 11:341-351 (2000)) and added to water to give a concentration of about 5% to about 40% by weight relative to the total weight of the solution. The two solutions may further comprise various additives, and may optionally be sterilized before use. The two solutions may be applied to an anatomical site on tissue of a living organism in various ways, which are well known in the art of tissue adhesives.

EXAMPLES

The various embodiments of the present invention are further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "mL" means milliliter(s), "L" means liter(s), "µL" means microliter(s), "mol" means mole(s), "mmol" means millimole(s), "g" means gram(s), "mg" means milligram(s), "mm" means millimeter(s), "Pa" means pascal(s), "kPa" means kilopascal(s), "psig" means pounds per square inch gauge, "wt %" means percent by weight, "PEG" means poly(ethylene glycol)", "MW" means nominal molecular weight, "$M_w$" means weight-average molecular weight, "$M_n$" means number-average molecular weight, "$M_z$" means z-average molecular weight, "dn/dc" means the specific refractive index increment (i.e., the change in refractive index per change in concentration), "IV" means intrinsic viscosity, "MHz" means megahertz, "SEC" means size exclusion chromatography, "PBS" means phosphate buffered saline, "$^1$H NMR" means proton nuclear magnetic resonance spectroscopy, "DMSO-$d_6$" means deuterated dimethyl sulfoxide, and "Ac" means an acetate group.

Example 1

Synthesis of an 8-Arm Star PEG Chloride Having a Molecular Weight of 10,000

The purpose of this Example was to prepare an 8-arm star PEG chloride having a molecular weight of 10,000. The 8-arm star PEG chloride was prepared by reacting an 8-arm star PEG-OH with thionyl chloride in the absence of a solvent.

Eight-arm star PEG-OH, MW 10,000 (determined by hydroxyl end group titration assuming all the polymer molecules have eight arms), was obtained from NOF America Corp. (White Plains, N.Y.). The 8-arm star PEG-OH (100 g in a 500-mL round-bottom flask) was dried either by heating with stirring at 85° C. under vacuum (0.06 mm of mercury (8.0 Pa)) for 4 h or by azeotropic distillation with 50 g of toluene under reduced pressure (15 mm of mercury (2 kPa)) with a pot temperature of 60° C.

The 8-arm star PEG-OH was allowed to cool to room temperature. Then, thionyl chloride (35 mL, 0.48 mol) was added to the flask, which was equipped with a reflux condenser, and the mixture was heated at 85° C. with stirring under a blanket of nitrogen for 24 h. Excess thionyl chloride was removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride. The yield of 8-arm star PEG-Cl was 100.9 g (99%).

$^1$H NMR (500 MHz, DMSO-$d_6$) δ 3.71-3.69 (m, 16H), 3.67-3.65 (m, 16H), 3.50 (s, ~800H). Aqueous SEC with mass analysis by light scattering [30° C., PBS (10 mM phosphate, 2.7 mM KCl, 0.137 M NaCl, pH 7.4), 0.5 mL/min, two Suprema Linear M mixed-bed columns (Polymer Standards Services, Silver Springs, Md.), do/dc 0.135 mL/g] gave $M_w$ 7,100, $M_w/M_n$ 1.2, $M_z/M_w$ 1.2, and IV 9.1 mL/g.

The end group conversion was determined to be 99% by acetylation of residual hydroxyl end groups and analysis by $^1$H NMR as follows. A sample of 8-arm star PEG-Cl (0.2 g) was dissolved in a mixture of 0.25 mL of acetic anhydride and 0.35 mL of pyridine and left at ambient temperature overnight. The reaction was quenched by addition of 5 g of ice. The aqueous layer was extracted with three 3-mL portions of chloroform, and the combined chloroform extracts were washed successively with three 1-mL portions of 20% aqueous sodium bisulfate, two 1-mL portions of saturated aqueous sodium bicarbonate, and 1 mL of water. The chloroform was evaporated under reduced pressure. The residue was dissolved in 2 mL of water, and the resulting cloudy solution was concentrated until clear under reduced pressure to remove residual chloroform. The solution was frozen and lyophilized, and the residue was dissolved in DMSO-$d_6$ and analyzed by $^1$H NMR.

The proportion of residual hydroxyl end groups in the 8-arm star PEG-Cl was determined by comparing the integrals of the $^1$H NMR peaks for the —$CH_2OAc$ end groups [δ 4.09 (t, J=4.7 Hz, 2H, $CH_2OAc$) and 2.00 (s, 3H, AcO)] with that of the $CH_2Cl$ end groups [δ 3.72-3.68 (m, 2H, $CH_2Cl$)].

Example 2

Synthesis of an 8-Arm Star PEG Amine Having a Molecular Weight of 10,000 Using Concentrated Aqueous Ammonia The purpose of this Example was to prepare an 8-arm star PEG amine having a molecular weight of 10,000. The 8-arm star PEG amine was prepared by reacting an 8-arm star PEG chloride with concentrated aqueous ammonia at 60° C. Ion exchange chromatography was used to remove the HCl formed in the reaction.

The 8-arm star PEG-Cl (100.9 g), prepared as described in Example 1, was dissolved in 640 mL of concentrated aqueous ammonia (28 wt %) and heated in a sealed vessel (i.e., sealed Hastelloy® corrosion resistant alloy pressure vessel) at 60° C. for 48 h, resulting in a developed pressure of 40 psig (276 kPa). The solution was sparged for 1 to 2 h with dry nitrogen to drive off 50 to 70 g of ammonia. The solution was then passed through a column (500 mL bed volume) of strongly basic anion exchange resin (Purolite® A-860, The Purolite Co., Bala-Cynwyd, Pa.) in the hydroxide form. The eluant was collected, and three 250-mL portions of de-ionized water were passed through the column and collected. The aqueous fractions were combined, concentrated under reduced pressure (15 mm of mercury (2 kPa), bath temperature 60° C.) to about 200 g, frozen in portions and lyophilized to give 97.4 g of product (98% yield).

Treatment of the 8-arm star PEG-$NH_2$ with excess acetic anhydride in pyridine, as described in Example 1, and examination of the product in DMSO-$d_6$ by $^1$H NMR indicated complete conversion of the chloride end groups and an overall 99% conversion of —OH end groups to —$NH_2$ end groups. The proportion of residual hydroxyl end groups in the 8-arm star PEG-$NH_2$ was determined by comparing the integral of the $^1$H NMR peak for the —OAc end groups [δ 2.00 (s)] with that of the —NHAc end groups [δ 1.78 (s)].

Example 3

Synthesis of an 8-Arm Star PEG Amine Having a Molecular Weight of 10,000 Using Concentrated Aqueous Ammonia The purpose of this Example was to prepare an 8-arm star PEG amine having a molecular weight of 10,000. The 8-arm star PEG amine was prepared by reacting an 8-arm star PEG chloride with concentrated aqueous ammonia at 60° C. The HCl formed in the reaction was converted to a salt by the addition of potassium carbonate and the 8-arm star PEG amine was separated from the salt by solvent extraction.

The 8-arm star PEG-Cl (100.9 g), prepared as described in Example 1, was dissolved in 640 mL of concentrated aqueous ammonia (28 wt %) and heated in a sealed vessel (i.e., sealed Hastelloy® corrosion resistant alloy pressure vessel) at 60° C. for 48 h, resulting in a developed pressure of 40 psig (276 kPa). The solution was sparged for 1 to 2 h with dry nitrogen to drive off 50 to 70 g of ammonia. The sparged reaction solution was concentrated under reduced pressure (15 mm of mercury (2 kPa), bath temperature 60° C.) to about 200 g, made basic by the addition of 12 g of potassium carbonate, and extracted successively with 300, 200, and 100 mL of chloroform. The combined chloroform extracts were dried over magnesium sulfate, filtered, and evaporated under reduced pressure (15 mm of mercury (2 kPa), bath temperature 40° C.). The residue was taken up in 300 mL of dichloromethane, filtered to remove insolubles, and stripped of solvent under reduced pressure (15 mm of mercury (2 kPa), bath temperature 40° C.). Water (100 g) was added to the residue, giving a cloudy solution, which was concentrated under reduced pressure (15 mm of mercury (2 kPa), bath temperature 40° C.) briefly to remove dichloromethane and produce a clear solution. This solution was frozen in portions and lyophilized to give a 97% yield of 8-arm star PEG-$NH_2$.

¹H NMR (500 MHz, DMSO-d₆) δ 3.50 (m, ~800H), 3.34 (t, J=5.8 Hz, 2H), 2.62 (t, J=5.8 Hz, 2H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 10,300, $M_w/M_n$ 1.5, $M_z/M_w$ 1.7, IV 11 mL/g.

Treatment of the 8-arm star PEG-NH₂ with excess acetic anhydride in pyridine and examination of the product by ¹H NMR, as described in Example 2, indicated complete conversion of the chloride end groups and an overall 99% conversion of —OH end groups to —NH₂ end groups.

Example 4

Synthesis of an 8-Arm Star PEG Amine Having a Molecular Weight of 10,000 Using Concentrated Aqueous Ammonia The purpose of this Example was to prepare an 8-arm star PEG amine having a molecular weight of 10,000. The 8-arm star PEG amine was prepared by reacting an 8-arm star PEG chloride with concentrated aqueous ammonia at 80° C.

The 8-arm star PEG-Cl (5 g), prepared as described in Example 1, was dissolved in 50 mL of concentrated aqueous ammonia (28 wt %) and heated in a sealed vessel (i.e., sealed Hastelloy® corrosion resistant alloy pressure vessel) at 80° C. for 4 h, resulting in a developed pressure of 70 psig (483 kPa). The solution was filtered and concentrated under reduced pressure (15 mm of mercury (2 kPa), bath temperature 60° C.) to about 20 mL, made basic by the addition of 1 g of potassium carbonate, and extracted three times with 20-mL portions of chloroform. The combined chloroform extracts were dried over magnesium sulfate, filtered, and evaporated under reduced pressure (15 mm of mercury (2 kPa), bath temperature 40° C.). The residue was taken up in 20 mL of dichloromethane, filtered to remove insolubles, and stripped of solvent under reduced pressure (15 mm of mercury (2 kPa), bath temperature 40° C.). Water (5 mL) was added to the residue, giving a cloudy solution, which was concentrated under reduced pressure (15 mm of mercury (2 kPa), bath temperature 40° C.) briefly to remove dichloromethane and produce a clear solution. This solution was frozen and lyophilized to give 8-arm star PEG-NH₂.

Analysis of the product by ¹H NMR and SEC gave results that were consistent with those reported in Example 3.

Treatment of the 8-arm star PEG-NH₂ with excess acetic anhydride in pyridine and examination of the product by ¹H NMR, as described in Example 2, indicated complete conversion of the chloride end groups and an overall 98.5% conversion of —OH end groups to —NH₂ end groups.

Example 5

Synthesis of an 8-Arm Star PEG Amine Having a Molecular Weight of 10,000 Using Anhydrous Ammonia The purpose of this Example was to prepare an 8-arm star PEG amine having a molecular weight of 10,000. The 8-arm star PEG amine was prepared by reacting an 8-arm star PEG chloride with anhydrous ammonia at 60° C. Ion exchange chromatography was used to remove the HCl formed in the reaction.

The 8-arm star PEG-Cl (10 g), prepared as described in Example 1, was combined with 40 g of anhydrous ammonia and heated in a sealed vessel (i.e., sealed Hastelloy® corrosion resistant alloy pressure vessel) at 60° C. for 24 h, resulting in a developed pressure of 365 psig (2520 kPa). The mixture was cooled to room temperature, and the ammonia evaporated. The residue was dissolved in 50 mL of de-ionized water, and the resulting solution was passed through a column (50 mL bed volume) of strongly basic anion exchange resin (Purolite® A-860) in the hydroxide form. The eluant was collected, and two 150-mL portions of de-ionized water were passed through the column and collected. The aqueous fractions were combined, concentrated under reduced pressure (15 mm of mercury (2 kPa), bath temperature 60° C.) to about 20 g, frozen and lyophilized to give 8-arm star PEG-NH₂.

Analysis of the product by ¹H NMR and SEC gave results that were consistent with those reported in Example 3.

Treatment of the 8-arm star PEG-NH₂ with excess acetic anhydride in pyridine and examination of the product by ¹H NMR, as described in Example 2, indicated complete conversion of the chloride end groups and an overall 98.5% conversion of —OH end groups to —NH₂ end groups.

Example 6

Synthesis of an 8-Arm Star PEG Amine Having a Molecular Weight of 10,000 Using Anhydrous Ammonia The purpose of this Example was to prepare an 8-arm star PEG amine having a molecular weight of 10,000. The 8-arm star PEG amine was prepared by reacting an 8-arm star PEG chloride with anhydrous ammonia at 80° C. Ion exchange chromatography was used to remove the HCl formed in the reaction.

The 8-arm star PEG-Cl (10 g), prepared as described in Example 1, was combined with 40 g of anhydrous ammonia and heated in a sealed vessel (i.e., sealed Hastelloy® corrosion resistant alloy pressure vessel) at 80° C. for 6 h, resulting in a developed pressure of 580 psig (4000 kPa). The mixture was cooled to room temperature, and the ammonia evaporated. The residue was dissolved in 50 mL of de-ionized water, and the resulting solution was passed through a column (50 mL bed volume) of strongly basic anion exchange resin (Purolite® A-860) in the hydroxide form. The eluant was collected, and two 150-mL portions of de-ionized water were passed through the column and collected. The aqueous fractions were combined, concentrated under reduced pressure (15 mm of mercury (2 kPa), bath temperature 60° C.) to about 20 g, frozen and lyophilized to give 8-arm star PEG-NH₂.

Analysis of the product by ¹H NMR and SEC gave results that were consistent with those reported in Example 3.

Treatment of the 8-arm star PEG-NH₂ with excess acetic anhydride in pyridine and examination of the product by ¹H NMR, as described in Example 2, indicated complete conversion of the chloride end groups and an overall 98.5% conversion of —OH end groups to —NH₂ end groups.

Example 7

Synthesis of a 6-Arm Star PEG Chloride Having a Molecular Weight of 10,000

The purpose of this Example was to prepare a 6-arm star PEG chloride having a molecular weight of 10,000. The 6-arm star PEG chloride was prepared by reacting a 6-arm star PEG-OH with thionyl chloride in the absence of a solvent.

Six-arm star PEG-OH, MW 10,000 (determined by hydroxyl end group titration assuming all the polymer molecules have six arms), was obtained from SunBio Corp. (Orinda, Calif.). The 6-arm star PEG-OH (50 g in a 300-mL round-bottom flask) was dried by heating with stirring at 90° C. under vacuum (0.1 mm of mercury (13 Pa)) for 16 h. The 6-arm star PEG-OH was allowed to cool to room temperature. Then, thionyl chloride (13 mL, 0.18 mol) was added to the flask, which was equipped with a reflux condenser, and the mixture was heated at 90° C. with stirring under a blanket of nitrogen for 16 h. Excess thionyl chloride was removed by rotary evaporation (bath temp 40° C.). Two successive 25-mL portions of toluene were added and evaporated under reduced pressure (15 mm of mercury (2 kPa), bath temperature 60° C.) to complete the removal of thionyl chloride. The product was dried at 90° C. with stirring under vacuum (0.06 mm of mercury (8 Pa)). The yield of the 6-arm star PEG-Cl was 49.0 g (97%).

$^1$H NMR (500 MHz, DMSO-$d_6$) δ 3.71-3.69 (m, 12H), 3.67-3.65 (m, 12H), 3.50 (s, ~620H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 7,300, $M_w/M_n$ 1.2, $M_z/M_w$ 1.1, and IV 9.9 mL/g.

The conversion of hydroxyl end groups to chloride end groups was determined to be 99% using the method described in Example 1.

Example 8

Synthesis of a 6-Arm Star PEG Amine Having a Molecular Weight of 10,000 Using Concentrated Aqueous Ammonia The purpose of this Example was to prepare a 6-arm star PEG-amine having a molecular weight of 10,000. The 6-arm star PEG amine was prepared by reacting a 6-arm star PEG chloride with concentrated aqueous ammonia. Ion exchange chromatography was used to remove the HCl formed in the reaction.

The 6-arm star PEG-Cl (48.9 g), prepared as described in Example 7, was dissolved in 232 mL of concentrated aqueous ammonia (28 wt %) and heated in a sealed vessel (i.e., sealed Hastelloy® corrosion resistant alloy pressure vessel) at 60° C. for 48 h, resulting in a developed pressure of about 40 psig (276 kPa). The solution was sparged for 2 h with dry nitrogen and then concentrated by rotary evaporation (15 mm of mercury (2 kPa), bath temperature 60° C.) to about 160 g. The solution was then passed through a column (450 mL bed volume) of strongly basic anion exchange resin (Purolite® A-860) in the hydroxide form. The eluant was collected, and three 200-mL portions of de-ionized water were passed through the column and collected. The aqueous fractions were combined, concentrated under reduced pressure (15 mm of mercury (2 kPa), bath temperature 60° C.) to about 130 g, frozen in portions and lyophilized to give 46.6 g (96% yield).

$^1$H NMR (500 MHz, DMSO-$d_6$) δ 3.50 (m, ~700H), 3.34 (t, J=5.8 Hz, 12H), 2.63 (t, J=5.8 Hz, 12H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 10,260, $M_w/M_n$ 1.3, $M_z/M_w$ 1.4, IV 5.7 mL/g.

Treatment of the 6-arm star PEG-NH$_2$ with excess acetic anhydride in pyridine and examination of the product by $^1$H NMR, as described in Example 2, indicated complete conversion of the chloride end groups and an overall 99% conversion of —OH end groups to —NH$_2$ end groups.

Example 9

Synthesis of a 4-Arm Star PEG Chloride Having a Molecular Weight of 2,000

The purpose of this Example was to prepare a 4-arm star PEG chloride having a molecular weight of 2,000. The 4-arm star PEG chloride was prepared by reacting a 4-arm star PEG-OH with thionyl chloride at ambient temperature in dichloromethane as solvent.

Four-arm star PEG-OH, MW 2,000 (determined by hydroxyl end group titration assuming all the polymer molecules have four arms), was obtained from NOF America (White Plains, N.Y.). The 4-arm star PEG-OH (100 g in a 500-mL round-bottom flask) was dissolved in 100 mL of dichloromethane. Thionyl chloride (88 mL, 1.2 mol) was added, and the mixture was stirred under a blanket of nitrogen at ambient temperature for 24 h. Excess thionyl chloride and dichloromethane were removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride. The yield of 4-arm star PEG-Cl was 100.1 g (97%).

$^1$H NMR (500 MHz, DMSO-$d_6$) δ 3.71-3.68 (m, 8H), 3.67-3.65 (m, 8H), 3.57-3.55 (m, 8H), 3.50 (m, ~140H), 3.47-3.45 (m, 8H), 3.31 (s, 8H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 1,890, $M_w/M_n$ 1.1, $M_z/M_w$ 1.0, IV 5.7 mL/g.

The conversion of hydroxyl end groups to chloride end groups was determined to be 98% using the method described in Example 1.

Example 10

Synthesis of a 4-Arm Star PEG Amine Having a Molecular Weight of 2,000 Using Concentrated Aqueous Ammonia The purpose of this Example was to prepare a 4-arm star PEG amine having a molecular weight of 2,000. The 4-arm star PEG amine was prepared by reacting a 4-arm star PEG chloride with concentrated aqueous ammonia. Ion exchange chromatography was used to remove the HCl formed in the reaction.

The 4-arm star PEG-Cl (39.15 g), prepared as described in Example 9, was dissolved in 600 mL of concentrated aqueous ammonia (28 wt %) and heated in a sealed vessel (i.e., sealed Hastelloy® corrosion resistant alloy pressure vessel) at 60° C. for 48 h, resulting in a developed pressure of about 40 psig (276 kPa). The solution was sparged for 1.5 h with dry nitrogen and then concentrated by rotary evaporation (15 mm of mercury (2 kPa), bath temperature 60° C.) to about 500 g. The solution was then passed through a column (500 mL bed volume) of strongly basic anion exchange resin (Purolite® A-860) in the hydroxide form. The eluant was collected, and two 250-mL portions of de-ionized water were passed through the column and collected. The aqueous fractions were combined and evaporated under reduced pressure (15 mm of mercury (2 kPa), bath temperature 60° C.) to give 36.43 g (97% yield).

¹H NMR (500 MHz, CDCl₃) δ 3.65-3.51 (m, ~170H), 3.47 (m, 8H), 3.36 (s, 8H), 2.86 (t, J=5.3 Hz, 7.4H), 2.76 (t, J=5.4 Hz, 0.6H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 2,330, $M_w/M_n$ 1.2, $M_z/M_w$ 1.3, IV 2.2 mL/g.

Treatment of the 4-arm star PEG-NH₂ with excess acetic anhydride in pyridine and examination of the product by ¹H NMR, as described in Example 2, indicated complete conversion of the chloride end groups and an overall 96% conversion of —OH end groups to —NH₂ end groups.

Example 11

Synthesis of a 4-Arm Star PEG Chloride Having a Molecular Weight of 2,000 Using N,N-Dimethylformamide and Ferric Chloride as Catalysts The purpose of this Example was to prepare a 4-arm star PEG chloride having a molecular weight of 2,000. The 4-arm star PEG chloride was prepared by reacting a 4-arm star PEG-OH with thionyl chloride in the presence of DMF (N,N-dimethylformamide) and ferric chloride as catalysts.

The 4-arm star PEG-OH, MW 2,000, (50 g) was dried azeotropically by dissolving in 50 mL of toluene and then evaporating under reduced pressure (15 mm of mercury (2 kPa), bath temperature 60° C.). The dried 4-arm star PEG-OH was dissolved in 50 mL of fresh toluene, and ferric chloride (16 mg) and DMF (0.75 mL) were added. Thionyl chloride (15 mL, 0.2 mol) was added, and the mixture was stirred under a blanket of nitrogen at 70° C. for 8 h. Excess thionyl chloride and toluene were removed by rotary evaporation (bath temp 60° C.). Two successive 25-mL portions of toluene were added and evaporated under reduced pressure (15 mm of mercury (2 kPa), bath temperature 60° C.) to complete the removal of thionyl chloride. The residue was dissolved in 75 mL of dichloromethane, filtered through a pad of silica gel, and rinsed through with a little more dichloromethane. Solvent was stripped by rotary evaporation (bath temp 40° C.) to give the 4-arm star PEG-Cl.

Analysis of the product by ¹H NMR and SEC gave results that were consistent with those reported in Example 9.

Example 12

Synthesis of a 4-Arm Star PEG Chloride Having a Molecular Weight of 2,000 Using N,N-Dimethylformamide as Catalyst The purpose of this Example was to prepare a 4-arm star PEG chloride having a molecular weight of 2,000. The 4-arm star PEG chloride was prepared by reacting a 4-arm star PEG-OH with thionyl chloride in the presence of DMF (N,N-dimethylformamide) as a catalyst.

The 4-arm star PEG-OH, MW 2,000, (50 g) was dried azeotropically by dissolving in 50 mL of toluene and then evaporating under reduced pressure (15 mm of mercury (2 kPa), bath temperature 60° C.). The dried 4-arm star PEG-OH was dissolved in 50 mL of fresh toluene, and DMF (0.37 mL) was added. Thionyl chloride (15 mL, 0.2 mol) was added, and the mixture was stirred under a blanket of nitrogen at 70° C. for 8 h. Excess thionyl chloride and toluene were removed by rotary evaporation (bath temp 60° C.). Two successive 25-mL portions of toluene were added and evaporated under reduced pressure (15 mm of mercury (2 kPa), bath temperature 60° C.) to complete the removal of thionyl chloride.

Analysis of the product by ¹H NMR and SEC gave results that were consistent with those reported in Example 9.

Example 13

Synthesis of a 4-Arm Star PEG Amine Having a Molecular Weight of 2,000 Using Concentrated Aqueous Ammonia The purpose of this Example was to prepare a 4-arm star PEG amine having a molecular weight of 2,000. The 4-arm star PEG amine was prepared by reacting a 4-arm star PEG chloride with concentrated aqueous ammonia. Ion exchange chromatography was used to remove the HCl formed in the reaction.

The 4-arm star PEG-Cl (45.7 g), prepared as described in Example 11, was dissolved in 703 mL of concentrated aqueous ammonia (28 wt %) and heated in a sealed vessel (i.e., sealed Hastelloy® corrosion resistant alloy pressure vessel) at 60° C. for 48 h, resulting in a developed pressure of about 40 psig (276 kPa). The solution was filtered, sparged with dry nitrogen for 16 h, causing it to lose 279 g, and then it was passed through a column (450 mL bed volume) of strongly basic anion exchange resin (Purolite® A-860) in the hydroxide form. The eluant was collected, and three 250-mL portions of de-ionized water were passed through the column and collected. The aqueous fractions were combined and evaporated under reduced pressure (15 mm of mercury (2 kPa), bath temperature 60° C.) to give 4-arm star PEG-NH₂.

Analysis of the product by ¹H NMR and SEC gave results that were consistent with those reported in Example 10.

Treatment of the 4-arm star PEG-NH₂ with excess acetic anhydride in pyridine and examination of the product by ¹H NMR, as described in Example 2, indicated complete conversion of the chloride end groups and an overall 98% conversion of —OH end groups to —NH₂ end groups.

Example 14

Synthesis of a 4-Arm Star PEG Chloride Having a Molecular Weight of 2,000

The purpose of this Example was to prepare a 4-arm star PEG chloride having a molecular weight of 2,000. The 4-arm star PEG chloride was prepared by reacting a 4-arm star PEG-OH with thionyl chloride at 60° C. in the absence of a solvent.

The 4-arm star PEG-OH (100 g) was added to a 500-mL round-bottom flask containing thionyl chloride (88 mL), previously chilled to −78° C., and the mixture was stirred under a blanket of nitrogen at 60° C. for 20 h. Excess thionyl chloride was removed by rotary evaporation (bath temp 40° C.). Two successive 50-mL portions of toluene were added and evaporated under reduced pressure (15 mm of mercury (2 kPa), bath temperature 55° C.) to complete the removal of thionyl chloride.

Analysis of the product by ¹H NMR and SEC gave results that were consistent with those reported in Example 9.

Example 15

Synthesis of a 4-Arm Star PEG Amine Having a Molecular Weight of 2,000 Using Anhydrous Ammonia The purpose of this Example was to prepare a 4-arm star PEG amine having a molecular weight of 2,000. The 4-arm star PEG amine was prepared by reacting a 4-arm star PEG chloride with anhydrous ammonia at 60° C. Ion exchange chromatography was used to remove the HCl formed in the reaction.

The 4-arm star PEG-Cl (50 g), prepared as described in Example 14, was combined with 513 g of anhydrous ammonia and heated in a sealed vessel (i.e., sealed Hastelloy® corrosion resistant alloy pressure vessel) at 60° C. for 48 h, resulting in a developed pressure of about 365 psig (2520 kPa). The mixture was cooled to room temperature, and the ammonia evaporated. The residue was dissolved in enough de-ionized water to make 500 mL of solution, and the resulting solution was passed through a column (500 mL bed volume) of strongly basic anion exchange resin (Purolite® A-860) in the hydroxide form. The eluant was collected, and three 250-mL portions of de-ionized water were passed through the column and collected. The aqueous fractions were combined, evaporated under reduced pressure (15 mm of mercury (2 kPa), bath temperature 60° C.) and dried further under vacuum (0.06 mm of mercury (8 Pa)) to give 4-arm star PEG-NH$_2$.

Analysis of the product by $^1$H NMR and SEC gave results that were consistent with those reported in Example 10.

Treatment of the 4-arm star PEG-NH$_2$ with excess acetic anhydride in pyridine and examination of the product by $^1$H NMR, as described in Example 2, indicated complete conversion of the chloride end groups and an overall 96% conversion of —OH end groups to —NH$_2$ end groups.

Example 16

Synthesis of a Star PEG Chloride Having a Mixture of Numbers of Arms and Molecular Weights The purpose of this Example was to prepare a star PEG chloride having a mixture of numbers of arms and molecular weights. A mixture of 4-arm star PEG chloride, MW 2,000, and 8-arm PEG chloride, MW 10,000, was prepared by reacting a mixture of 4-arm star PEG-OH, MW 2,000, and 8-arm PEG-OH, MW 10,000, with thionyl chloride in the absence of a solvent.

A mixture of the 4-arm star PEG-OH, MW 2,000, (30 g) and the 8-arm star PEG-OH, MW 10,000, (30 g) were dried by heating at 66° C. under vacuum (0.06 mm of mercury (8 Pa) for 16 h. Thionyl chloride (37 mL) was added, and the mixture was stirred under a blanket of nitrogen at 66° C. for 16 h. Excess thionyl chloride was removed by rotary evaporation (bath temp 60° C.). Two successive 100-mL portions of toluene were added and evaporated under reduced pressure (15 mm of mercury (2 kPa), bath temperature 60° C.) to complete the removal of thionyl chloride.

The conversion of hydroxyl end groups to chloride end groups was determined to be ≧99% using the method described in Example 1.

Example 17

Synthesis of an 8-Arm Star PEG Chloride Having a Molecular Weight of 40,000

The purpose of this Example was to prepare an 8-arm star PEG chloride having a molecular weight of 40,000. The 8-arm star PEG chloride was prepared by reacting an 8-arm star PEG-OH with thionyl chloride in dichloromethane as solvent.

Eight-arm star PEG-OH, MW 40,000 (determined by hydroxyl end group titration assuming all the polymer molecules have eight arms), was obtained from NOF America Corp. (White Plains, N.Y.). The 8-arm star PEG-OH (100 g) was dissolved in 200 mL of dichloromethane, and thionyl chloride (15 mL, 0.20 mol) was added. The mixture was stirred at room temperature under a blanket of nitrogen for 24 h. Excess thionyl chloride and dichloromethane were removed by rotary evaporation (bath temp 40° C.). Two successive 100-mL portions of toluene were added and evaporated under reduced pressure (15 mm of mercury (2 kPa), bath temperature 60° C.) to complete the removal of thionyl chloride. The yield of 8-arm star PEG-Cl was 101 g (100%).

$^1$H NMR (500 MHz, DMSO-d$_6$) δ 3.71-3.69 (m, 16H), 3.67-3.65 (m, 16H), 3.50 (s, ~3500H). Aqueous SEC with mass analysis by light scattering [30° C., PBS (10 mM phosphate, 2.7 mM KCl, 0.137 M NaCl, pH 7.4), 0.5 mL/min, two Suprema Linear M mixed-bed columns (Polymer Standards Services, Silver Springs, Md.), do/dc 0.135 mL/g] gave $M_w$ 30,000, $M_w/M_n$ 1.3, $M_z/M_w$ 1.3, and IV 12 mL/g.

Example 18

Synthesis of an 8-Arm Star PEG Amine Having a Molecular Weight of 40,000 Using Concentrated Aqueous Ammonia The purpose of this Example was to prepare an 8-arm star PEG amine having a molecular weight of 40,000. The 8-arm star PEG amine was prepared by reacting an 8-arm star PEG chloride with concentrated aqueous ammonia at 60° C. The HCl formed in the reaction was converted to a salt by the addition of potassium carbonate and the 8-arm star PEG amine was separated from the salt by solvent extraction.

The 8-arm star PEG-Cl (101 g), prepared as described in Example 17, was dissolved in 500 mL of concentrated aqueous ammonia (28 wt %) and heated in a sealed vessel (i.e., sealed Hastelloy® corrosion resistant alloy pressure vessel) at 60° C. for 48 h, resulting in a developed pressure of about 40 psig (276 kPa). The solution was sparged for 2 h with dry nitrogen, resulting in the loss of 53 g and then concentrated under reduced pressure (15 mm of mercury (2 kPa), bath temperature 60° C.) to about 300 g, made basic by the addition of 3 g of potassium carbonate, and extracted successively with 400, 200, and 100 mL portions of chloroform. The combined chloroform extracts were dried over magnesium sulfate, filtered, and evaporated under reduced pressure (15 mm of mercury (2 kPa), bath temperature 40° C.). The residue was taken up in 300 mL of dichloromethane, filtered to remove insolubles, and stripped of solvent under reduced pressure (15 mm of mercury (2 kPa), bath temperature 40° C.). Water (100 g) was added to the residue, giving a cloudy solution, which was concentrated under reduced pressure (15 mm of mercury (2 kPa), bath temperature 40° C.) briefly to remove dichloromethane and produce a clear solution. This solution was frozen in portions and lyophilized to give 8-arm star PEG-NH$_2$.

$^1$H NMR (500 MHz, DMSO-d$_6$) δ 3.50 (m, ~3900H), 3.35 (t, J=5.8 Hz, 16H), 2.64 (t, J=5.8 Hz, 16H). Aqueous SEC with mass analysis by light scattering [30° C., PBS (10 mM phosphate, 2.7 mM KCl, 0.137 M NaCl, pH 7.4), 0.5 mL/min, two Polymer Standards Services Suprema Linear M mixed-bed columns, do/dc 0.135 mL/g] gave $M_w$ 32,000, $M_w/M_n$ 1.1, $M_z/M_w$ 1.1, IV 12 mL/g.

Treatment of the 8-arm star PEG-NH$_2$ with excess acetic anhydride in pyridine and examination of the product by $^1$H NMR, as described in Example 2, indicated complete conversion of the chloride end groups and an overall 95% conversion of —OH end groups to —NH$_2$ end groups.

Example 19

Synthesis of an 8-Arm PEG Chloride Having a Molecular Weight of 10,000

The purpose of this Example was to prepare an 8-arm star PEG chloride having a molecular weight of 10,000. The 8-arm star PEG chloride was prepared by reacting an 8-arm star PEG-OH with thionyl chloride in the presence of a solvent. Less than six moles of thionyl chloride per mole equivalent of hydroxyl group were used in the reaction with a reaction time of four hours.

Eight-arm star PEG-OH, MW 10,000, (100 g in a 500-mL round-bottom flask) was dried by azeotropic distillation with 100 mL of toluene under reduced pressure (15 mm of mercury (2 kPa)) with a pot temperature of 60° C.

The 8-arm star PEG-OH was melted at 85° C. and dissolved in 100 mL of toluene. Thionyl chloride (23.5 mL, 0.32 mol) was added to the flask, which was equipped with a reflux condenser, and the mixture was heated at 85° C. with stirring under a blanket of nitrogen for 4 h. Excess thionyl chloride was removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride. The yield of 8-arm star PEG-Cl was 93 g (92%).

The conversion of hydroxyl end groups to chloride end groups was determined to be >99% using the method described in Example 1. Analysis of the product by $^1$H NMR and SEC gave results that were consistent with those reported in Example 1.

Example 20

Synthesis of an 8-Arm PEG Amine Having a Molecular Weight of 10,000

The 8-arm star PEG chloride prepared as described in Example 19 was converted into an 8-arm star PEG amine according to the method of Example 2. Treatment of the 8-arm star PEG amine with excess acetic anhydride in pyridine and examination of the product by $^1$H NMR, as described in Example 2, indicated complete conversion of the chloride end groups and an overall 99% conversion of —OH end groups to —NH$_2$ end groups. Analysis of the product by $^1$H NMR and SEC gave results that were consistent with those reported in Example 2.

Example 21

Synthesis of a 4-Arm PEG Chloride Having a Molecular Weight of 2,000 at 85° C. Using N,N-Dimethylformamide as Catalyst The purpose of this Example was to prepare a 4-arm star PEG chloride having a molecular weight of 2,000. The 4-arm star PEG chloride was prepared by reacting a 4-arm star PEG-OH with thionyl chloride at 85° C. in the presence of DMF (N,N-dimethylformamide) as a catalyst.

Four-arm star PEG-OH, MW 2,000, (100 g in a 500-mL round-bottom flask) was dried by azeotropic distillation with 100 mL of toluene under reduced pressure (15 mm of mercury (2 kPa)) with a pot temperature of 60° C.

The 4-arm star PEG-OH was dissolved in 100 mL of toluene. Thionyl chloride (58 mL, 0.80 mol) was added to the flask, which was equipped with a reflux condenser, and the mixture was heated at 85° C. with stirring under a blanket of nitrogen for 2.5 h. Excess thionyl chloride was removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride.

The conversion of hydroxyl end groups to chloride end groups was determined to be >99% using the method described in Example 1. Analysis of the product by $^1$H NMR and SEC gave results that were consistent with those reported in Example 9.

Example 22

Synthesis of a 4-Arm PEG Amine Having a Molecular Weight of 2,000

The 4-arm star PEG chloride prepared as described in Example 21 was converted into a 4-arm star PEG amine according to the method of Example 10. Treatment of the 4-arm star PEG amine with excess acetic anhydride in pyridine and examination of the product by $^1$H NMR, as described in Example 2, indicated complete conversion of the chloride end groups and an overall 99% conversion of —OH end groups to —NH$_2$ end groups. Analysis of the product by $^1$H NMR and SEC gave results that were consistent with those reported in Example 10.

Example 23

Synthesis of an 8-Arm PEG Chloride Having a Molecular Weight of 40,000 Using N,N-Dimethylformamide as Catalyst The purpose of this Example was to prepare an 8-arm star PEG chloride having a molecular weight of 40,000. The 8-arm star PEG chloride was prepared by reacting an 8-arm star PEG-OH with thionyl chloride in the presence DMF (N,N-dimethylformamide) as a catalyst.

Eight-arm star PEG-OH, MW 40,000, (100 g in a 500-mL round-bottom flask) was dried by azeotropic distillation with 100 mL of toluene under reduced pressure (15 mm of mercury (2 kPa)) with a pot temperature of 60° C.

The 8-arm star PEG-OH was dissolved with heating at 85° C. in 100 mL of toluene. Thionyl chloride (6 mL, 0.08 mol) was added to the flask, which was equipped with a reflux condenser, and the mixture was heated at 85° C. with stirring under a blanket of nitrogen for 8 h. Excess thionyl chloride was removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride.

The conversion of hydroxyl end groups to chloride end groups was determined to be >99% using the method described in Example 1. Analysis of the product by $^1$H NMR and SEC gave results that were consistent with those reported in Example 17.

What is claimed is:

1. A method for making a composition comprising at least one multi-arm PEG chloride having from 3 to about 10 arms comprising the steps of:
 a) reacting at a temperature of less than or equal to about 100° C., optionally in the presence of a solvent, thionyl chloride and at least one multi-arm PEG polyol having from 3 to about 10 arms, to form a multi-arm PEG chloride having at least about 95% of hydroxyl end groups of the multi-arm PEG polyol converted to chloride end groups; and b) separating the multi-arm PEG chloride from unreacted thionyl chloride and the optional solvent.

2. A method according to claim 1 wherein the reacting of step (a) is at a temperature of about 0° C. to about 100° C.

3. A method according to claim 1 wherein the reacting of step (a) is at a temperature of about 20° C. to about 100° C.

4. A method according to claim 1 wherein the reacting of step (a) is done for a time of about 2 hours to about 24 hours.

5. A method according to claim 1 wherein the optional solvent is selected from the group consisting of toluene, benzene, xylene, chlorobenzene, dichloromethane, chloroform, carbon tetrachloride, 1,2-dichloroethylene, trichloroethylene, perchloroethylene, 1,2-dichloroethane, 1,1,1-trichloroethane, diethyl ether, diisopropyl ether, tetrahydrofuran, dioxane, acetone, methyl ethyl ketone, methyl isobutyl ketone, N,N-dimethylformamide, N,N-dimethylacetamide, and mixtures thereof.

6. A method according to claim 1 wherein the separating of step (b) is done by removing the thionyl chloride and the optional solvent by evaporating under reduced pressure.

7. A method according to claim 1 wherein the multi-arm PEG polyol is selected from the group consisting of an 8-arm star PEG polyol, a 6-arm star PEG polyol, and a 4-arm star PEG polyol.

8. A method according to claim 1 wherein the reacting of step (a) is done in the presence of a catalyst.

9. A method according to claim 8 wherein the catalyst is selected from the group consisting of an N,N-dialkylformamide, an iron(III) salt and mixtures thereof.

10. A method according to claim 9 wherein the N,N-dialkylformamide is selected from the group consisting of N,N-dimethylformamide, N,N-diethylformamide, N-formylmorpholine, N-formylpiperidine, and N-formylpyrrolidine.

11. A method according to claim 9 wherein the iron (III) salt is selected from the group consisting of ferric chloride, ferric oxide, and ferric sulfate.

* * * * *